United States Patent Office 3,517,981
Patented June 30, 1970

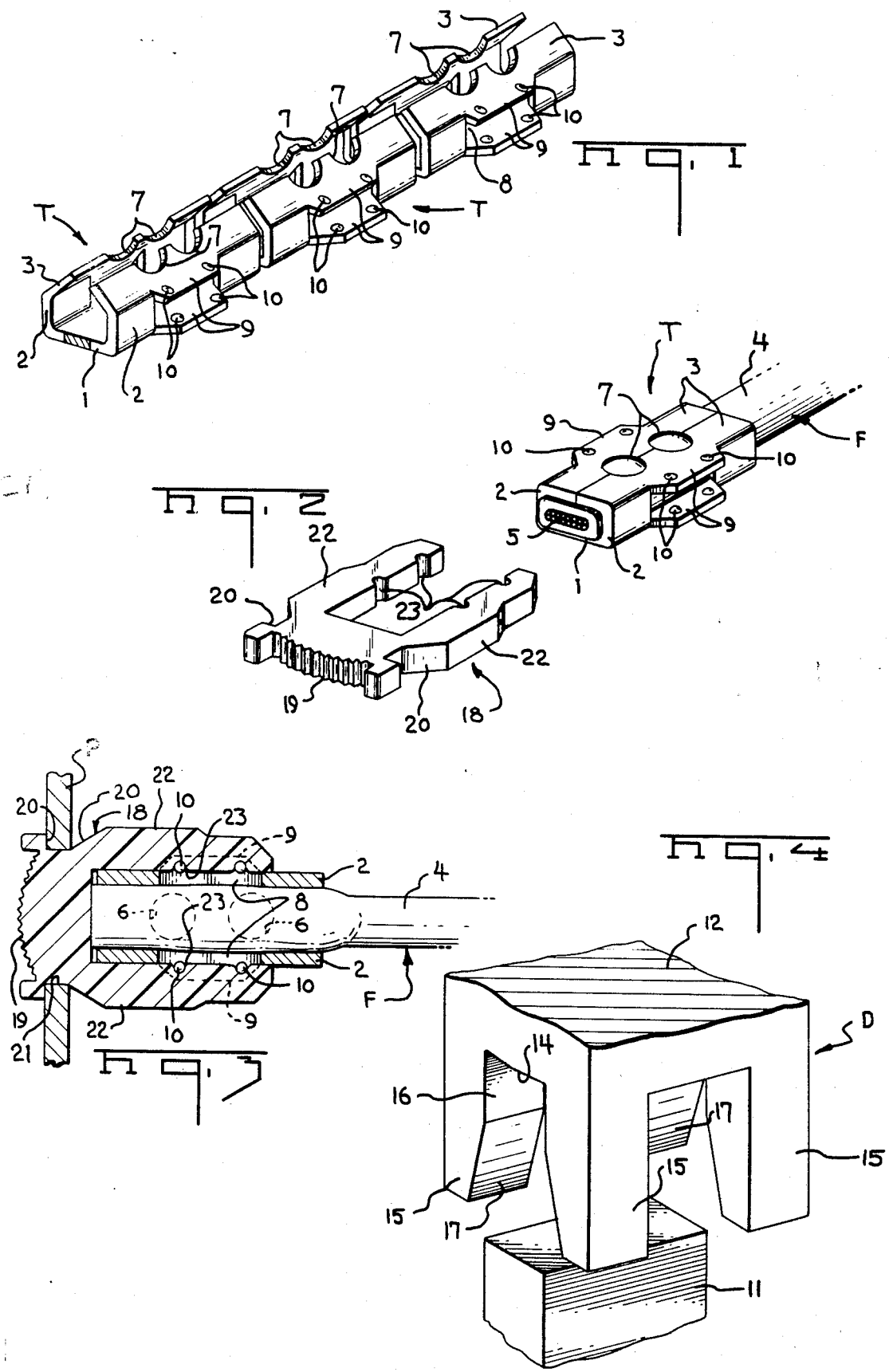

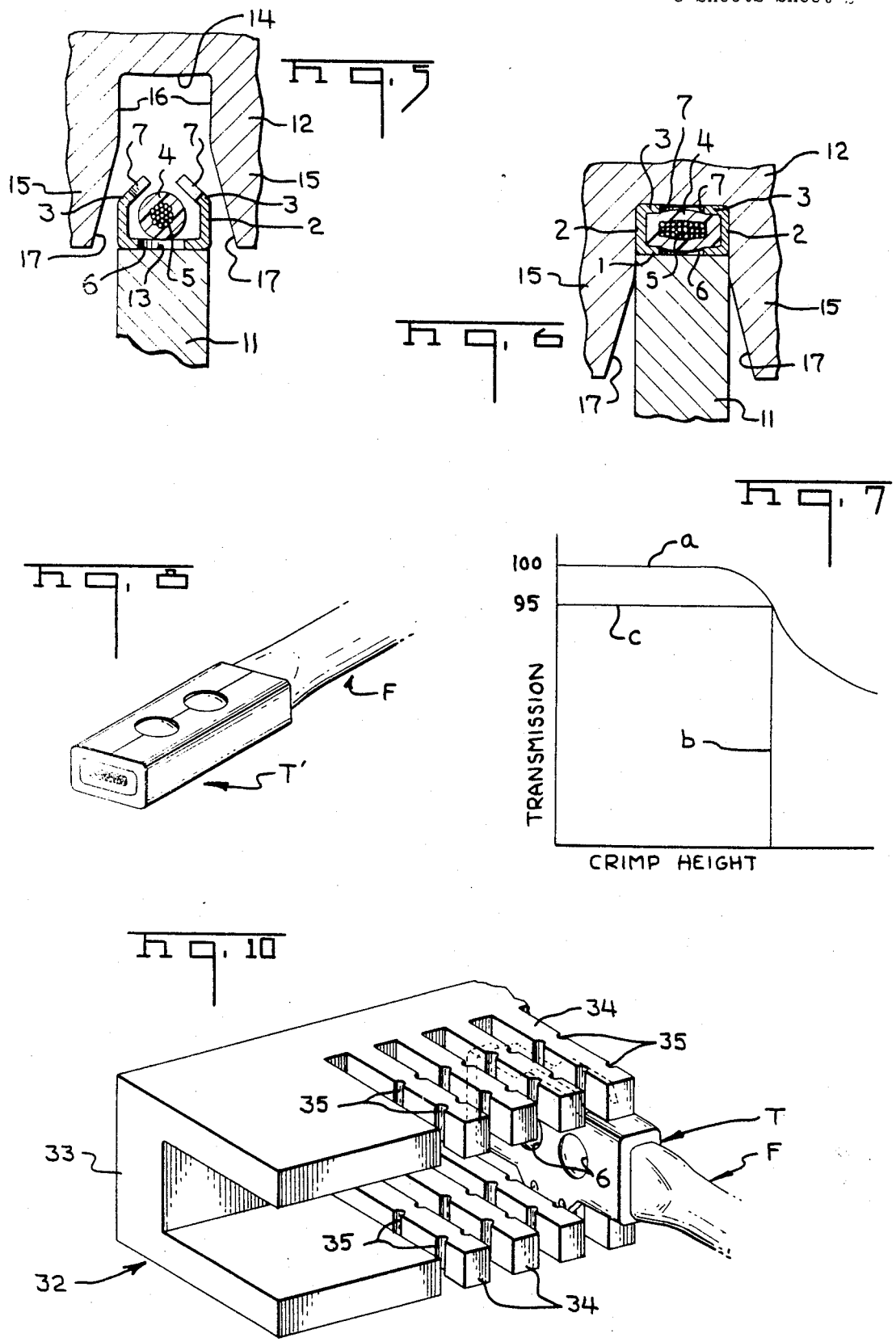

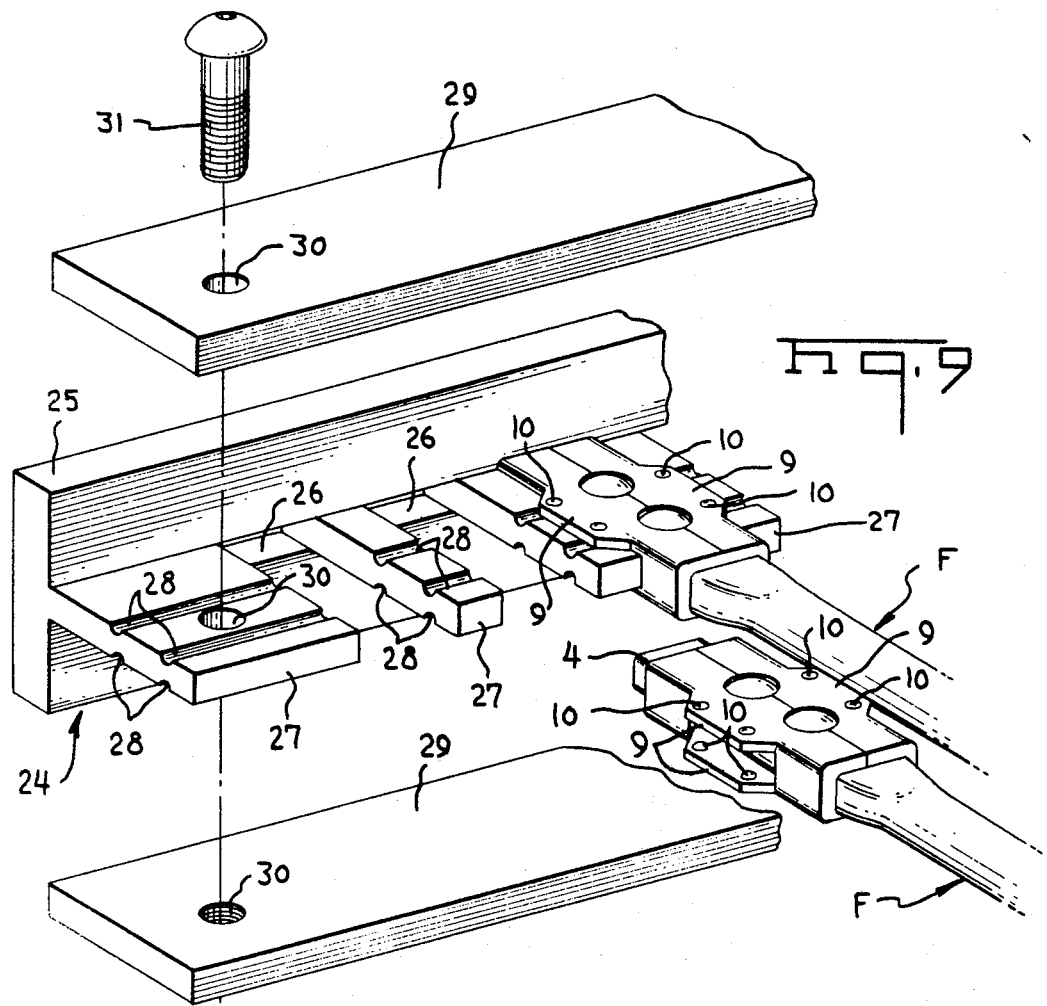
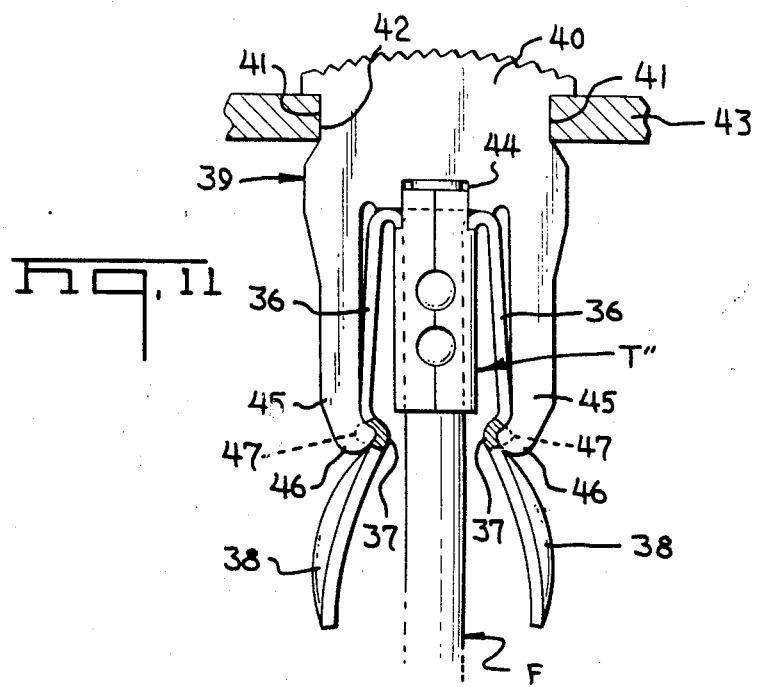

3,517,981
TERMINATION MEMBERS FOR FIBER OPTIC MEANS
Herman Rueger, Lancaster, and Joseph Richard Keller, Harrisburg, Pa., assignors to AMP Incorporated, Harrisburg, Pa.
Filed June 15, 1966, Ser. No. 557,797
Int. Cl. G02b 5/14
U.S. Cl. 350—96        15 Claims

ABSTRACT OF THE DISCLOSURE

A terminal member is adapted to be secured onto the end of a fiber optic means at a minimum loss of transmission characteristics of the fiber optic means.

---

This invention relates to fiber optics and more particularly to termination means to terminate fiber optic means.

Fiber optics are increasingly being used to transmit information, to indicate conditions and other uses in conjunction with light. The fiber optics are mounted between a light source and an indicating or intelligence receiving means, and it is important to use a terminating and mounting means that does not materially reduce the light transmission characteristics of the fiber optic means and that maintains the ends of the fiber optic means in alignment for effective operation capability.

An object of the invention is to provide termination members to terminate fiber optic means.

Another object of the invention is the provision of termination members to terminate fiber optic means without materially reducing the transmission characteristics of the fiber optic means.

A further object of the invention is to provide termination members that will readily and effectively terminate fiber optic means and mount the fiber optic means in position on a mounting means.

An additional object of the invention is the provision of termination members for fiber optic means and lens means therefor.

A still further object of the invention is to provide lens means for termination members of fiber optic means and the lens means serves as a mounting means for the termination members.

Still another object of the invention is a method of crimping termination members onto fiber optic means.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration in order that others skilled in the art may fully understand the invention and the principles thereof and the manner of applying it in practical use so that they may modify it in various forms, each as may be best suited to the conditions of a particular use.

The foregoing and other objects are achieved by a terminal member securable onto fiber optic means having a covering member of plastic, the terminal member comprising a sheet of material having a bottom section, side sections and top sections, the top sections defining a width substantially equal to the width of the bottom section, the side sections extending outwardly from the bottom section in the same direction and substantially parallel to each other, the top sections in a nonsecured condition extending outwardly from the side sections at obtuse angles relative to the side sections, and an extrusion area disposed in at least one of the sections into which the covering member thereunder extrudes when the top sections are moved into engagement with the fiber optic means to secure the terminal member onto the fiber optic means.

In the drawings:

FIG. 1 is a perspective view of termination members in strip form;

FIG. 2 is a perspective exploded view of a termination member secured onto fiber optic means and a lens member exploded therefrom;

FIG. 3 is a cross-sectional view of FIG. 2 in an assembled condition;

FIG. 4 is an exploded perspective view of die members to crimp the termination members of FIG. 1 onto fiber optic means;

FIGS. 5 and 6 illustrate the crimping dies and crimping operation of a termination member onto fiber optic means;

FIG. 7 is a graph illustrating the transmission characteristics of the fiber optic means versus the crimp height of the termination member;

FIG. 8 is a perspective view of an embodiment of the invention;

FIG. 9 is an exploded perspective view of mounting means for the termination members;

FIG. 10 is a perspective view of an embodiment of the mounting means; and

FIG. 11 is a partial cross-sectional view of an alternative embodiment of the termination member and lens member therefor.

FIG. 1 illustrates termination members T in strip form. The termination members are susceptible to mass production by automatic machinery and are conveniently formed by shaping a sheet metal blank or strip of a suitable material such as brass or the like in successive forming steps. The metal is sufficiently hard and resilient and has spring-like characteristics, yet it is sufficiently malleable to permit crimping of the termination members onto fiber optic means to effect an excellent mechanical connection therewith.

Termination member T comprises a bottom section 1, side sections 2 and top sections 3. Side sections 2 extend outwardly from bottom section 1 substantially parallel with respect to each other and top sections 3 are disposed at an obtuse angle with respect to respective side sections 2 so that the free ends of top sections 3 are spaced from each other, as illustrated in FIGS. 1 and 5, to define an entrance through which fiber optic means F is introduced within termination member T.

Fiber optic means F comprises a covering member 4 of compressible or resilient plastic surrounding fiber optic members 5 made from any suitable combination of light transmitting materials and the number of fiber optic members depends upon the amount of light to be transmitted. The fiber optic means is of the type manufactured by E. I. du Pont de Nemours and Company under the trademark Crofon. The fiber optic means is flexible so that in bending the fiber optic means to accommodate a desired situation, the fiber optic members move relative to each other, and, if the ends of the fiber optic means are not properly terminated, the ends of the fiber optic members extend outwardly from the ends of the covering member at irregular intervals thereby resulting in an improper alignment for the ends of the fiber optic members because they are most effective when the ends of all the fiber optic members are located in the same or substantially the same plane.

Openings 6 are located in bottom section 1 and each of top sections 3 has arcuate recesses 7 disposed in the edge thereof and the arcuate recesses in one top section are in alignment with the arcuate recesses in the other top section. Openings 6 and arcuate recesses 7 define extrusion areas to be explained in greater detail hereinafter and they can take any form other than those illustrated. In the embodiment of FIGS. 1 through 3, openings 8 are disposed in side sections 2 and these openings also provide extrusion areas.

Wings 9 extend outwardly from side sections 2 on each side of openings 8 and these wings are extensions of bottom section 1 and top sections 3. Inwardly directed dimples 10 are disposed in wings 9 with the dimples in one wing being disposed opposite to the dimples in the opposing wing.

FIGS. 4 through 6 illustrate the dies and crimping action to crimp the termination members onto the fiber optic means. Die D, as illustrated in FIG. 4, comprises a stationary die member 11 and a movable die member 12 which are mountable in a conventional crimping machine (not shown). Stationary die member 11 has a flat anvil surface 13 on which the termination member is placed. Movable die member 12 has a bottom surface 14 and downwardly extending leg members 15 on each side of bottom surface 14 which are spaced from each other. The space between each pair of leg members on each side of bottom surface 14 is to accommodate wings 9 of the termination member. Each leg member has a straight surface 16 parallel to a respective side surface of stationary die member 11 and a tapered surface 17 which extends outwardly from straight surface 16. Bottom surface 14 from the center thereof to the outer edges thereof is slightly tapered in the form of a V.

To crimp a termination member T onto fiber optic means F, the termination member is placed on anvil surface 13 and the fiber optic means is introduced into the termination member either through the entrance between top sections 3 or from either end of the termination member, whichever is more desirable. Movable die member 12 is then brought into engagement with the termination member with straight surfaces 16 engaging side sections 2 and V-shaped bottom surface 14 engaging top sections 3. Straight surfaces 16 maintain side sections 2 in their substantially parallel positions while V-shaped bottom surface 14 moves top sections 3 into engagement with the fiber optic means as illustrated in FIG. 6, causing the fiber optic means to assume the configuration of the termination member which in this case is rectangular in cross-section. The ends of the fiber optic members are secured relative to each other so that the ends are disposed in a plane or substantially in a plane. The ends may be polished in accordance with conventional practices to improve tight transmission and the light output can be colored in accordance with known techniques.

The movement of movable die member 12 relative to stationary die member 11 is controlled so that the movable die member crimps the termination member to the extent that a reduction of about 10% of the cross-section of the fiber optic means is effected in the crimped area which reduces the transmission characteristics of the fiber optic means about 5%, which is illustrated in the graph of FIG. 7 with curve A illustrating the transmission characteristics of the fiber optic means versus the crimp height of the termination member and lines B and C are the lines drawn from the X and Y axes and they intersect at a point on curve A to provide the optimum termination to secure the termination on the fiber optic means with a minimum reduction of transmission characteristics.

When the termination member has been secured on the fiber optic means by die members 11 and 12, the areas of covering member 4 underlying openings 6 and arcuate recesses 7 are extruded into these openings and recesses as well as into side openings 8 in order to increase the frictional engagement between the termination member and the fiber optic means. When V-shaped bottom surface 14 engages top sections 3, the tapered surfaces of bottom surface 14 move the free edges of top sections 3 inwardly, and, when movable die member 12 is moved away from stationary die member 11 after the crimping operation has been effected, top sections 3 move outwardly a slight amount so that the top sections are disposed substantially parallel with respect to bottom section 1. Tapered surfaces 17 facilitate the movement of movable die member 12 relative to stationary die member 11.

The obtention of the optimum crimp height is based upon the fact that the terminal member has a suitable length to effect a proper termination with a minimum loss of transmission. If the terminal member is increased in length, the transmission characteristics are reduced as a function of the length, providing the crimp height remains constant.

The termination member T' of FIG. 8 is the same as termination member T except that termination member T' is not provided with wings and side openings. The configuration of the termination member can take any suitable configuration to achieve the desired result. The termination members are crimped near the ends of the fiber optic means so that only a small portion of the fiber optic means extends outwardly therefrom as illustrated in FIG. 3. Crimping dies to crimp termination member T' are similar to the crimping dies to crimp termination member T except that the leg members are continuous with no spaces therein.

FIGS. 2 and 3 illustrate a lens member 18 onto which a crimped termination member can be removably mounted. Lens member 18 is made from any suitable light transmitting material and it can be any desirable color. Lens member 18 comprises a lens section 19 having an arcuate outer surface provided with serrations so that light which is transmitted through the lens section from the fiber optic means is dispersed for observation in many directions. Of course, lens section 19 can take any form to achieve the desirable result.

Recesses 20 are disposed in the sides of lens section 19 so that lens member 18 can be mounted in an aperture 21 of a panel P. The inner surfaces of recesses 20 are beveled so as to facilitate the insertion of lens member 18 within aperture 21. Legs 22 extend outwardly from lens section 19 in a parallel manner and depressions 23 are disposed on the inner surfaces of legs 22 with the depressions in one leg being in alignment with the depressions in the other leg. Depressions 23 are also spaced apart a distance corresponding to the distance between dimples 10 in each wing 9. The distance between legs 22 is such to accommodate termination member T and dimples 10 mate with depressions 23 to maintain termination member T in position on lens member 18 as illustrated in FIG. 3 in order to provide a combination lens and mounting means for the terminated fiber optic means.

FIG. 9 illustrates an alternative mounting means 24 which comprises a plate 25 having apertures 26 disposed therein at spaced intervals therealong. Apertures 26 have a configuration to accommodate the portion of the terminated fiber optic means that extends outwardly beyond the front of the termination member. Mounting members 27 extend outwardly from the rear surface of plate 25 and they are spaced apart a distance to accommodate the termination members for communication with apertures 26. Spaced grooves 28 are disposed in the top and bottom surfaces of mounting members 27 to receive dimples 10 of wings 9 in order to latchably secure the termination members on the mounting members.

If desired, plates 29 can be positioned on the termination members with holes 30 disposed at the ends thereof and in the end mounting members 27 in which a screw member 31 is disposed with one of holes 30 in plates 29 being threaded to mate with the threads of screw 31.

Plates 29 therefore secure the termination members on mounting members 27.

FIG. 10 illustrates another mounting means 32 comprising a plate 33 having spaced openings 33' disposed therealong. Mounting legs 34 extend outwardly from the rear surface of plate 33 with a pair of legs 34 being in alignment with an opening in plate 33. The spaces between mounting legs 34 accommodate termination members and grooves 35 disposed therein mate with dimples 10 to latchably secure the termination in position on the mounting legs.

Mounting members 27 and mounting legs 34 may have the retaining grooves disposed therein in positions other than illustrated, e.g. grooves 28 may be located on the sides of member 27 and grooves 35 may be located on the inner or opposing surfaces of legs 34.

FIG. 11 illustrates an alternative embodiment of the termination member and lens means therefor. In this embodiment, termination member T″ is similar to termination member T′ of FIG. 8 except that termination member T″ includes flexible arms 36 extending outwardly from the forward ends of the sides of the termination member and being bent back along the sides of the termination member. Flexible arms 36 extend outwardly from the sides of the termination member at an angular disposition with respect thereto. Depressions 37 are located in flexible arms 36 and engaging sections 38 extend outwardly from depressions 37 in order to move flexible arms 36 inwardly to mount the termination member onto lens and mounting means 39 which is similar to lens member 18 of FIGS. 2 and 3.

Lens and mounting means 39 comprises a lens section 40 which is provided with recesses 41 which fit within an aperture 42 of a panel 43 to hold the lens and mounting means in position. The rear surfaces of recesses 41 are beveled to facilitate the insertion of lens and mounting means 39 within aperture 42. A recess 44 is disposed in lens section 40 to accommodate the portion of terminal member T″ and the portion of the terminated fiber optic means extending outwardly from the termination member. Legs 45 extend outwardly from lens section 40 and inwardly-directed projections 46 are located at the inner ends of legs 45 to rest in depressions 37 of flexible arms 36 so that the spring characteristics of flexible arms 36 maintain the termination member in position on lens and mounting means 39. Extensions 47 are located on each side of depressions 37 to maintain projections 46 within depressions 37 to prevent projections 46 from slipping off of flexible arms 36 in a sidewise manner.

As can be discerned, there has been described a unique termination member for application onto fiber optic means, a method for crimping the termination members onto the fiber optic means and mounting means on which the crimped termination members are mounted.

It will, therefore, be appreciated that the aforementioned and other desirable objects have been achieved; however, it should be emphasized that the particular embodiments of the invention, which are shown and described herein, are intended as merely illustrative and not as restrictive of the invention.

The invention is claimed in accordance with the following:

1. A terminal member adapted to be secured onto fiber optic means having a covering member of plastic, the terminal member comprising a sheet of material having a bottom section, side sections and top sections, the top sections defining a width substantially equal to the width of the bottom section, the side sections extending outwardly from the bottom section in the same direction and substantially parallel to each other, the top sections in a nonsecured condition extending outwardly from the side sections toward each other at obtuse angles relative to the side sections, and an extrusion area disposed in at least one of the sections into which the covering member thereunder extrudes when the top sections are moved into engagement with the fiber optic means until the top sections are substantially parallel with said bottom section to secure the terminal member onto the fiber optic means at a minimum loss of transmission characteristics of the fiber optic means.

2. A terminal member according to claim 1 wherein wing means extend outwardly from said side sections as extensions of said top and bottom sections.

3. A terminal member according to claim 1 wherein said extrusion area includes openings in said bottom section and opposing recesses in said top sections.

4. A terminal member according to claim 1 wherein flexible arms extend outwardly from one end of said sheet of material and along said side sections.

5. A combination terminal member and mounting member for terminating and mounting fiber optic means; said terminal member comprising a sheet of material having a bottom section, side sections and top sections adapted to be secured on the fiber optic means with said side sections substantially parallel to each other and said bottom and top sections substantially parallel to each other when said terminal member is secured on an end of the fiber optic means in a manner such that loss of transmission characteristics of the fiber optic means is at a minimum, mounting means extending outwardly from said side sections and including holding means thereon; said mounting member comprising leg means spaced apart to receive the terminated terminal member therebetween so that the terminated end of the fiber optic means is positioned between the leg means, and means on said leg means mateable with said holding means to securely hold the terminated terminal member on said mounting member.

6. A combination terminal member and mounting member according to claim 5 wherein said mounting means includes wing members extending outwardly from said side sections as extensions of said top and bottom sections.

7. A combination terminal member and mounting member according to claim 6 wherein said holding means include inwardly-directed dimples in said wing members.

8. A combination terminal member and mounting member according to claim 5 wherein said mounting means includes flexible arms extending outwardly from one end of said side sections and along said side sections at an angular disposition with respect thereto.

9. A combination terminal member and mounting member according to claim 5 wherein said holding means includes depressions.

10. A combination terminal member and mounting member according to claim 5 wherein said mounting member defines a lens member having a lens section mounted within an aperture of a panel.

11. A combination terminal member and mounting member according to claim 5 wherein said mounting member includes a plate having spaced openings therealong.

12. A combination terminal member and mounting member according to claim 5 wherein said mateable means include depressions on opposing surfaces of said leg means.

13. A combination terminal member and mounting member according to claim 5 wherein said mateable means include inwardly-directed projections proximate inner ends of said leg means.

14. A combination terminal member and mounting member according to claim 5 wherein said mateable means include spaced grooves disposed in said leg means.

15. A connection between a terminal member and a pliable covering of fiber optic means comprising a sheet of material having a bottom section, side sections and top sections, extrusion area means in at least one of said sections, said terminal member in engagement with said pliable covering with said bottom and top sections substantially parallel with respect to each other and said fiber optic means in said terminal member assuming a configuration of said terminal member at a minimum loss of transmission characteristics of said fiber optic means, said pliable covering at said extrusion area means being extruded thereinto thereby securing said terminal member on said pliable covering.

References Cited

UNITED STATES PATENTS

| | | | |
|---|---|---|---|
| 2,339,147 | 1/1944 | Carlisle et al. | 339—223 |
| 2,939,905 | 6/1960 | Canfield | 339—223 XR |
| 2,759,163 | 8/1956 | Ustin et al. | 339—223 |
| 2,943,293 | 6/1960 | Bucher et al. | 339—223 |
| 3,146,051 | 8/1964 | Woofter et al. | 339—128 XR |
| 3,200,367 | 8/1965 | Blanchenot | 339—223 XR |
| 3,221,593 | 12/1965 | Ferris | 350—96 XR |
| 3,357,423 | 12/1967 | Winchester et al. | 350—96 XR |

DONALD A. GRIFFIN, Primary Examiner

U.S. Cl. X.R.

24—265; 29—517; 339—223